United States Patent
Kraxner et al.

(10) Patent No.: US 8,403,121 B2
(45) Date of Patent: Mar. 26, 2013

(54) SEALING DEVICE FOR A DUAL CLUTCH TRANSMISSION OF A MOTOR VEHICLE

(75) Inventors: Dieter Kraxner, Vaihingen an der Enz (DE); Peter Höbel, Neuhausen (DE); Markus Rettenmaier, Stuttgart (DE); Jens Patzner, Potsdam (DE)

(73) Assignees: ZF Friedrichshafen AG, Friedrichshafen (DE); Dr. Ing. h.c.F. Porsche AG, Stuttgart (DE)

( * ) Notice: Subject to any disclaimer, the term of this patent is extended or adjusted under 35 U.S.C. 154(b) by 663 days.

(21) Appl. No.: 12/095,563

(22) PCT Filed: Nov. 29, 2006

(86) PCT No.: PCT/EP2006/011436
§ 371 (c)(1),
(2), (4) Date: Aug. 31, 2010

(87) PCT Pub. No.: WO2007/062814
PCT Pub. Date: Jun. 7, 2007

(65) Prior Publication Data
US 2010/0307883 A1 Dec. 9, 2010

(30) Foreign Application Priority Data
Dec. 1, 2005 (DE) .......................... 10 2005 057 294

(51) Int. Cl.
*F16D 21/06* (2006.01)
*F16D 13/46* (2006.01)
*F16D 25/0638* (2006.01)
*F16H 57/04* (2010.01)

(52) U.S. Cl. .................. 192/48.619; 192/113.5; 74/330; 74/467

(58) Field of Classification Search .............. 192/48.619
See application file for complete search history.

(56) References Cited

U.S. PATENT DOCUMENTS
(Continued)

FOREIGN PATENT DOCUMENTS
DE  35 300 017 A1  2/1987
DE  41 15 989 A1  11/1992
(Continued)

OTHER PUBLICATIONS
DE10308711A1 Machine Translation Sep. 11, 2012.*
(Continued)

*Primary Examiner* — David D Le
*Assistant Examiner* — Mark Manley
(74) *Attorney, Agent, or Firm* — Davis & Bujold, PLLC (57) ABSTRACT

A device for sealing a double clutch transmission of a motor vehicle, with a transmission housing, in which are arranged a clutch chamber with clutch oil and a double clutch, a transmission chamber with transmission oil and a double clutch transmission wheel set and two co-axial drive shafts disposed, one inside the other. One drive shaft is an interior central shaft which extends inside the transmission chamber from the end of the second hollow drive shaft. The two drive shafts each have a sealing element to seal the clutch chamber from the transmission chamber. A mounting component is situated inside and fixed to the transmission housing to support two adjacent sealing elements. A first sealing element forms a seal radially on the hollow drive shaft and a second sealing element forms a seal radially on the central drive shaft to provide a reliable seal and offer a simple ventilation and leakage detection.

11 Claims, 8 Drawing Sheets

U.S. PATENT DOCUMENTS

| | | |
|---|---|---|
| 2,899,034 A | 8/1959 | Hubert |
| 4,498,353 A | 2/1985 | Kitade |
| 4,771,648 A | 9/1988 | Bardoll |
| 5,287,708 A * | 2/1994 | Hiramatsu et al. ............ 62/323.1 |
| 6,044,931 A * | 4/2000 | Reed et al. .................... 184/6.12 |
| 6,722,483 B2 | 4/2004 | Damm et al. |
| 7,234,579 B2 | 6/2007 | Grethel et al. |
| 2004/0232620 A1 * | 11/2004 | Bock et al. .................... 277/320 |

FOREIGN PATENT DOCUMENTS

| | | |
|---|---|---|
| DE | 101 34 118 A1 | 1/2003 |
| DE | 103 08 711 A1 | 9/2004 |
| DE | 10 2005 003 508 A1 | 8/2005 |
| DE | 10 2004 046 297 A1 | 3/2006 |
| DE | 10 2004 055 121 A1 | 5/2006 |
| EP | 1 467 130 A2 | 10/2004 |
| GB | 2 021 712 A | 12/1979 |

OTHER PUBLICATIONS

Crosses, J., "Gearing Up", *Automotive Engineering, Professional Engineering Publishing*, London, GB, Apr. 2003, pp. 66, 69-70.

* cited by examiner

SEALING DEVICE FOR A DUAL CLUTCH TRANSMISSION OF A MOTOR VEHICLE

This application is a national stage completion of PCT/EP2006/011436 filed Nov. 29, 2006, which claims priority from German Application Serial No. 10 2005 057 294.4 filed Dec. 1, 2005.

FIELD OF THE INVENTION

The invention relates to a device for sealing a double clutch transmission of a motor vehicle.

BACKGROUND OF THE INVENTION

Double clutch transmissions for motor vehicles are known in the art. Their principal advantage over conventional stepped manual transmissions is that the shifting processes of a gear change take place almost without interruption in propulsive force. In this manner, frequent changes in acceleration and load during gear shifting are avoided, resulting in more comfortable handling and enabling a sportier driving mode. In a popular construction, described in DE 101 34 118 A1, the double clutch transmission is equipped with two drive shafts (transmission input shafts), which are arranged co-axially in relation to one another, each with a friction clutch assigned on the input side, and a transmission wheel set for a group of gears, preferably with even-numbered gears on one side and odd-numbered gears and a reverse gear on the other side, assigned on the transmission side. The one drive shaft is configured as an external hollow shaft, inside of which the other drive shaft is disposed as an internal, central shaft, whereby the internal shaft emerges from the external shaft in a transition area inside a transmission chamber. Power is transmitted alternatingly via one of the drive shafts at a time.

A gear change is implemented via an overlapping release and engagement of the two clutches whereby, in each case, two gears are engaged sequentially to the drive shafts. Transmissions of this type are most frequently configured as automatic transmissions, i.e., the selected gear changes are controlled via hydraulic/electric actuators. Wet multi-plate clutches are usually used as the friction clutches and are situated in a clutch chamber adjacent to a transmission chamber, which accommodates the transmission wheel set for the double clutch transmission.

The clutch chamber and the transmission chamber can form a shared oil chamber inside the transmission housing. In contrast, an oil chamber divider, such as is described in DE 35 30 017 A1 and in DE 41 15 989 A1, offers the advantage of being able to use different oils for the double clutch and for the transmission with each oil being specially adapted to its specific requirements. In this case, the two oil chambers must be sealed off from one another, to prevent the oils from mixing together. In principle, in sealing oil chambers for transmissions, the technique of sealing shaft passages with radial shaft sealing rings is known. Sealing rings of this type generally have a U-shaped profile, on one leg of which a sealing lip is formed, which rests against the corresponding shaft. However, double clutch transmissions have the problem that the oil chambers must also be sealed off from one another directly in the area in which the radially interior drive shaft emerges from the radially exterior drive shaft inside the transmission chamber, because the two oil chambers are connected to one another via an annular gap between the shafts.

From DE 10 2004 046 297 A1, which was previously undisclosed, an arrangement for sealing co-axial drive shafts is known in which an enlarged annular gap is provided in the area in which the inner central shaft emerges from the outer hollow shaft. A double sealing ring, comprised of two radial shaft sealing rings, is positioned in the annular gap at the end. The double sealing ring rests in the hollow, exterior drive shaft and forms a seal against the interior drive shaft with the sealing lips of the two radial shaft sealing rings. Between the two radial shaft sealing rings, an intermediate space is provided, which is connected to a drain for ventilation and for leakage detection. The known configuration provides a structurally simple seal of the two shafts.

The disadvantage of this configuration is that the radial shaft sealing rings are acted upon by rotational speed as the exterior hollow shaft rotates. The resulting centrifugal forces can cause the sealing lips to separate from the central drive shaft, thereby impairing the seal tightness of the configuration. In addition, the drain used for ventilation and aeration, as well as for leak detection, is a relatively complicated structurally.

In consideration of the above, the object of the invention is to provide a sealing device of the type initially described, which will ensure a more reliable seal of two co-axial drive shafts, with one shift being partially accommodated inside the other, and which will simultaneously offer a simple option for ventilation and leakage detection.

SUMMARY OF THE INVENTION

The invention is based upon the knowledge that when drive shafts, which are arranged co-axially in relation to one another, are sealed in a double clutch transmission having separate oil chambers for the double clutch and the transmission, centrifugal forces generated by the rotating drive shafts can be prevented from affecting the seal by fixing the sealing elements, adjacent the drive shafts, to the housing. Fastening of the sealing elements to the housing can be implemented in a structurally advantageous manner by using a structural component that is fixed to the housing and is integrated into the transmission housing.

Accordingly, the invention is based upon a device for sealing a double clutch transmission of a motor vehicle, with a transmission housing in which a clutch chamber, which is filled with a clutch oil and is intended to accommodate a double clutch and a transmission chamber, which is filled with a transmission oil and is intended to accommodate a double clutch transmission set, are located with two co-axially disposed drive shafts. One of the drive shafts is configured as a radially interior, central shaft which emerges from the second drive shaft, which is configured as an exterior hollow shaft, at the latter's end surface inside the transmission chamber, and in which the two drive shafts are sealed by the use of at least one sealing element to seal the clutch chamber off from the transmission chamber.

To attain the stated object, the invention also provides that in the transmission housing, a mounting component, which is fixed to the housing, is located on which two adjacent sealing elements are held, wherein one sealing element forms a seal radially against the hollow shaft and the other sealing element forms a seal radially against the central shaft.

By accommodating the sealing elements in a housing-fast mounting component (hereinafter shortened to mount), a secure and sturdy sealing concept is provided in the double clutch transmission set for separate oil chambers of the double clutch and the transmission set in which no rotational speed loads caused by centrifugal forces will occur in the sealing element. This is achieved by the use of two sealing elements fastened to the mount, with each sealing element forming a seal against one of the two drive shafts. No additional structural changes to the conventional drive shafts are necessary, making this cost-effective.

Furthermore, it can preferably be provided that the two sealing elements are configured as double sealing rings, each of which consists of two radial shaft sealing rings. Radial shaft sealing rings have already proven effective in sealing shafts, and are available at relatively low cost in various configurations. It is particularly advantageous to use double sealing rings, each consisting of two spaced radial shaft sealing rings. In this manner, an oil-free chamber is formed inside the spacing distance, which can be used for a ventilation and/or aeration device to the outside of the transmission via the mount. Especially, this ventilation device, via the mounting component can be implemented with a simpler structure and thus more cost-effectively as compared with more expensive ventilation devices, via the interior of the central drive shaft, in accordance with the prior art. Advantageously, the ventilation device can simultaneously function as a mechanism for detecting the leakage of transmission oil and/or clutch oil in the case of leakiness of the sealing device.

It can further be provided that an intermediate area, which is connected to the clutch chamber, is formed between the double sealing rings, via which the radially interior radial shaft sealing rings can be supplied with clutch oil for purposes of lubrication and that outside of the double sealing rings, an exterior area, which is connected to the transmission chamber, is formed through which the radially exterior radial shaft sealing rings can be supplied with transmission oil for purposes of lubrication. With the intermediate area and the exterior area, reliable lubrication of the sealing rings on the shafts is ensured. In addition, this lubrication is even more effective than lubrication of a double sealing ring, which sits in a radial gap inside the exterior hollow shaft.

Advantageously, in the intermediate area between the double sealing rings, an oil return for returning the clutch oil to an oil reservoir assigned to the double clutch can also be provided. This oil return can also be a component of an interior lubrication concept for clutch lubrication.

The mounting component is advantageously situated in a transmission chamber which is at least partially open in a radial direction, whereby a compact configuration of the mounting component in a radial direction is favorable. For example, axially in relation to the area in which the central shaft emerges from the hollow shaft, in the same cross-sectional plane of the transmission, a synchronization device is provided for synchronizing the speed of a main shaft of the transmission, which is arranged parallel to the output shafts, with the respective gear wheel to be engaged, with radial clearance for the corresponding synchronizing sliding sleeve. Only a portion of the structural space in a radial direction is required for this. The mounting component can be structurally integrated into the transmission housing the open radial structural space in this area so that no additional axial structural space is required for the mounting component or for the sealing device.

It can further be provided that the mounting component is configured to perform at least one additional task in addition to the function of accommodating the sealing elements. Thus, means for accommodating an intermediate bearing for a reverse gear can also advantageously be formed on the mounting component. Here bearing forces which arise at the intermediate bearing, can be dissipated over at least a part of the transmission housing, thereby achieving a more favorable load distribution within the transmission.

Means for supporting at least one shift rod can also be formed on the mounting component. In addition, means for supporting at least one latching and/or locking element for the at least one shift rod can also be formed on the mounting component. Finally, means for fastening a sensor device, especially for sensors for identifying shift patterns and for detecting speed, can also be formed on the mounting component.

Owing to the described high functional integration of the mounting component, a reliable and sturdy seal of the co-axial drive shafts is achieved, which also makes particularly effective use of the structural space in the transmission. In this manner, a particularly compact double clutch transmission can be achieved. The structural space required in the transmission can even be reduced as compared with conventional constructions.

BRIEF DESCRIPTION OF THE DRAWINGS

The invention will now be described, by way of example, with reference to the accompanying drawings in which.

DETAILED DESCRIPTION OF THE INVENTION

Figure 1A:
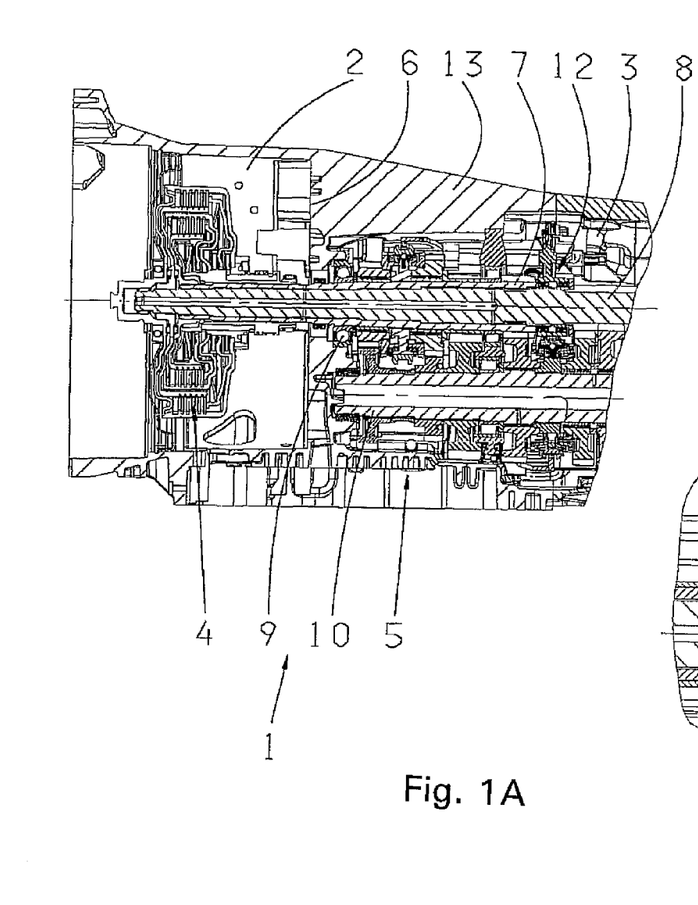
FIG. 1A is a plan view of a double clutch transmission with a sealing device according to the invention.
Figure 1B:
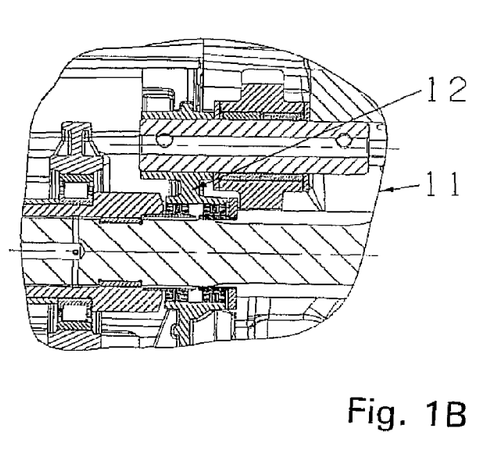
FIG. 1B is a magnified plan view of a portion of the double clutch transmission with a sealing device according to the invention.

According to the above, FIGS. 1A and 1B show a double clutch transmission 1 of a motor vehicle with separate oil chambers 2, 3. Oil chamber 2 is configured as a clutch chamber for accommodating a wet multi-plate, double clutch 4. Oil chamber 3 is configured as a transmission chamber, which accommodates a double clutch transmission set 5 in the sense of two partial transmissions. Oil chambers 2 and 3 are enclosed inside a shared transmission housing 13. The manner in which a double clutch transmission functions is known per se, therefore, in what follows, only the sealing device of the invention will be addressed in detail.

The oil chambers 2, 3 are separated by a dividing wall 6, through which two drive shafts run. The first drive shaft is configured as a hollow shaft 7, in which the second drive shaft is inserted co-axially as a central shaft 8. Each of the two shafts 7 and 8 is rotatably mounted and is connected to a single clutch of the double clutch 4 in the clutch chamber 2 and to a set for a group of gears in the transmission chamber 3. These sets (not specified in greater detail) cooperate alternatingly in a known manner with corresponding sets (also not specified in greater detail) of a main transmission shaft 10 and a pinion shaft 14. The hollow shaft 7 is rotatably mounted in the area of the dividing wall 6, and is sealed by a seal 9, for example a radial shaft sealing ring. Inside the transmission chamber 3, the central shaft 8 emerges from the hollow shaft 7. An area of emergence 11 is shown in the lower half of the drawing of FIG. 1B. In this area, a mounting component 12 is arranged, which extends in radial orientation in the transmission housing 13. According to FIGS. 1A and 1B, the mounting component 12 is located in a cross-sectional plane in the transmission housing, in which a synchronization device for the transmission is also arranged on the transmission output shaft or main shaft 10.

Figure 2:
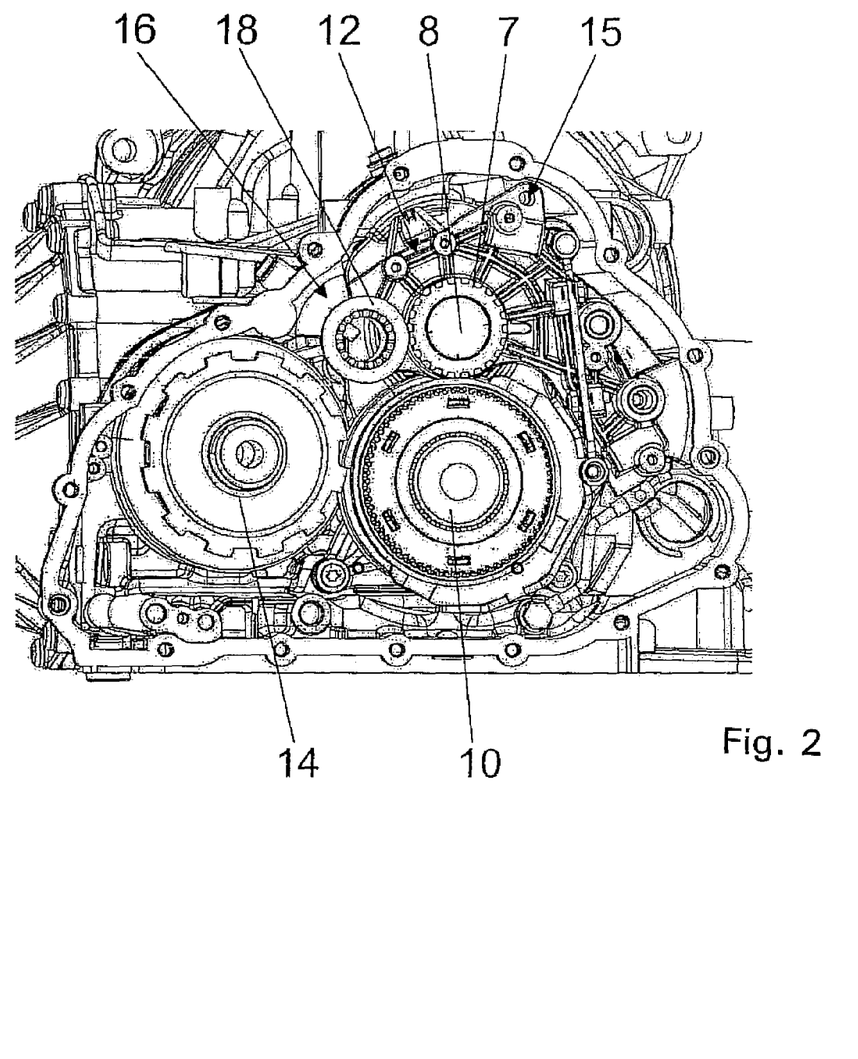
FIG. 2 is a sectional side view of the transmission with an integrated mounting component.
Figure 3:
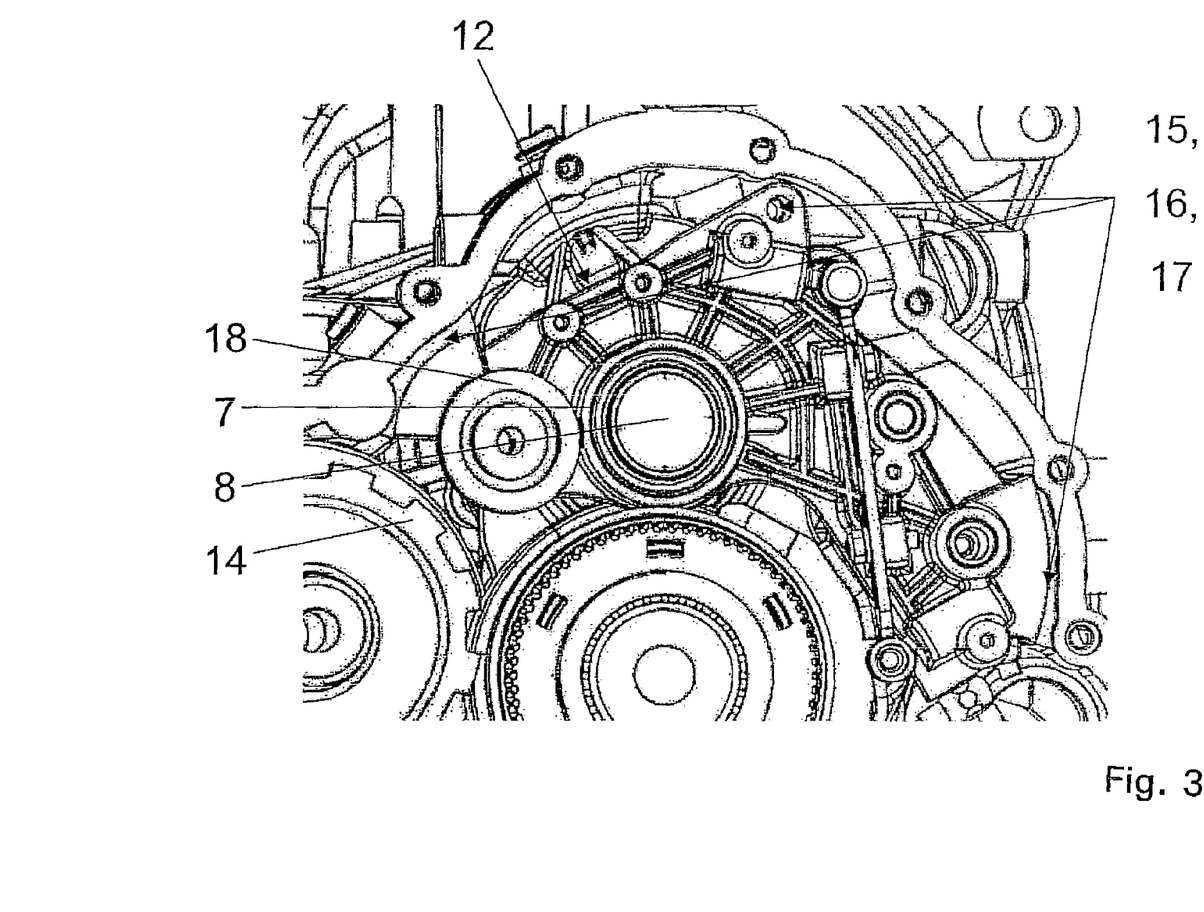
FIG. 3 is a section from FIG. 2, illustrating a tie for the housing to the mounting component.

The mounting component 12 is configured as a housing-fast strut and bearing structure with a high level of functional integration, which is shown in FIG. 2 in an enlarged side view of the double clutch transmission 1. The mounting component 12 essentially wraps around the two drive shafts 7, 8 above the main shaft 10 and the pinion shaft 14. FIG. 3 shows an enlarged section of FIG. 2, which details the attachment of the mounting component 12 to the transmission housing 13. At three attachment points 15, 16, 17, corresponding adapters are fastened to the transmission housing 13 and to the mounting component 12, which fix the mounting component 12 immovably to the housing. Furthermore, a reverse gear, intermediate wheel 18 is mounted on the mounting component 12.

Figure 5:
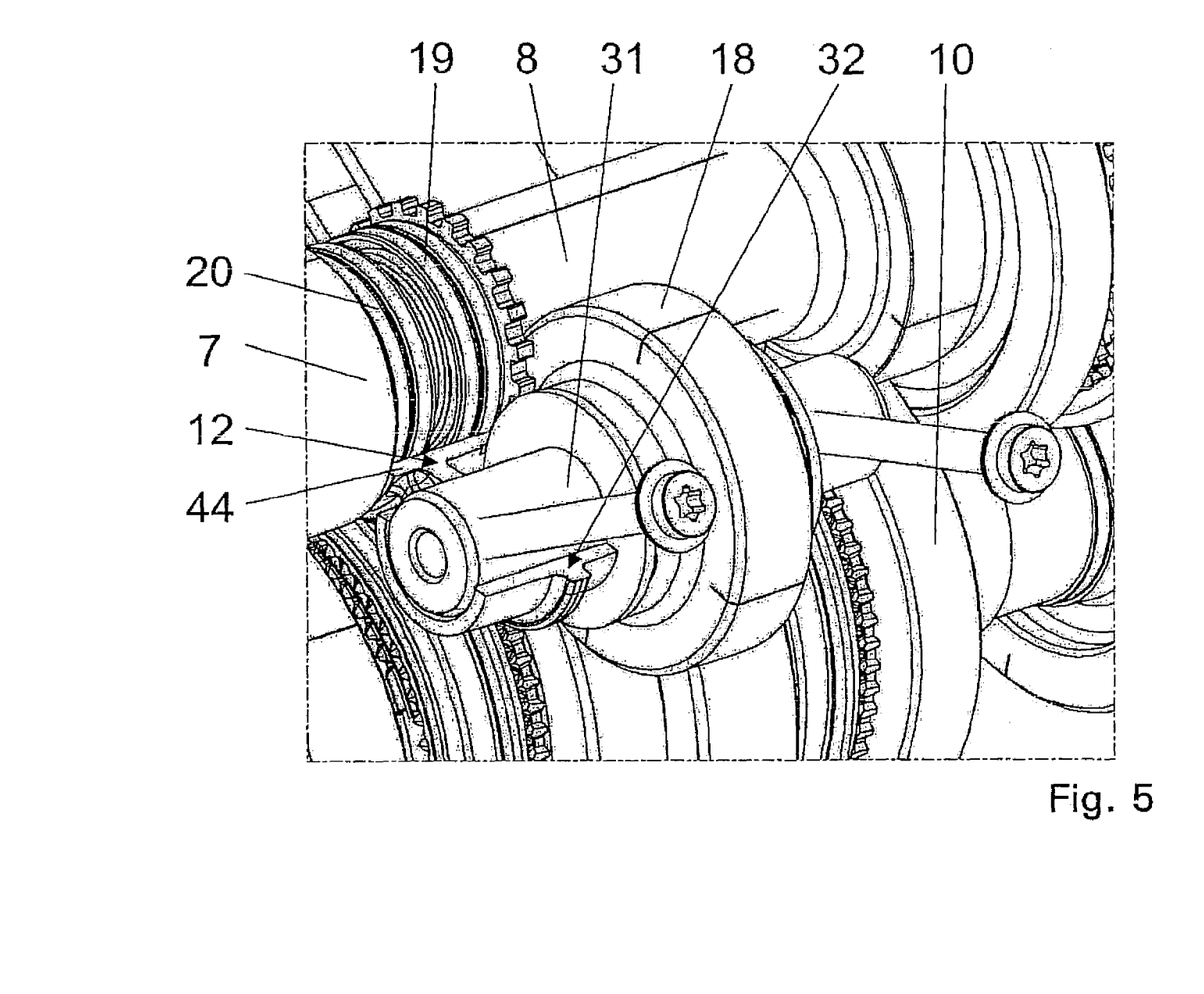
FIG. 5 is a detailed view of the transmission for accommodating a reverse gear intermediate wheel in the mounting component.

The attachment points 15, 16, 17 also act to distribute the load of bearing forces over the transmission housing 13, which especially originate from the reverse gear, intermediate wheel 18, which is supported on the mounting component 12. The support of the reverse gear, intermediate wheel 18 on the mounting component 12 is also shown in a perspective view in FIG. 5, for purposes of illustration. The reverse gear, intermediate wheel 18 has a fully floating axle 31, which is supported in a corresponding fitted bore 32 of the mounting component 12.

Figure 4:
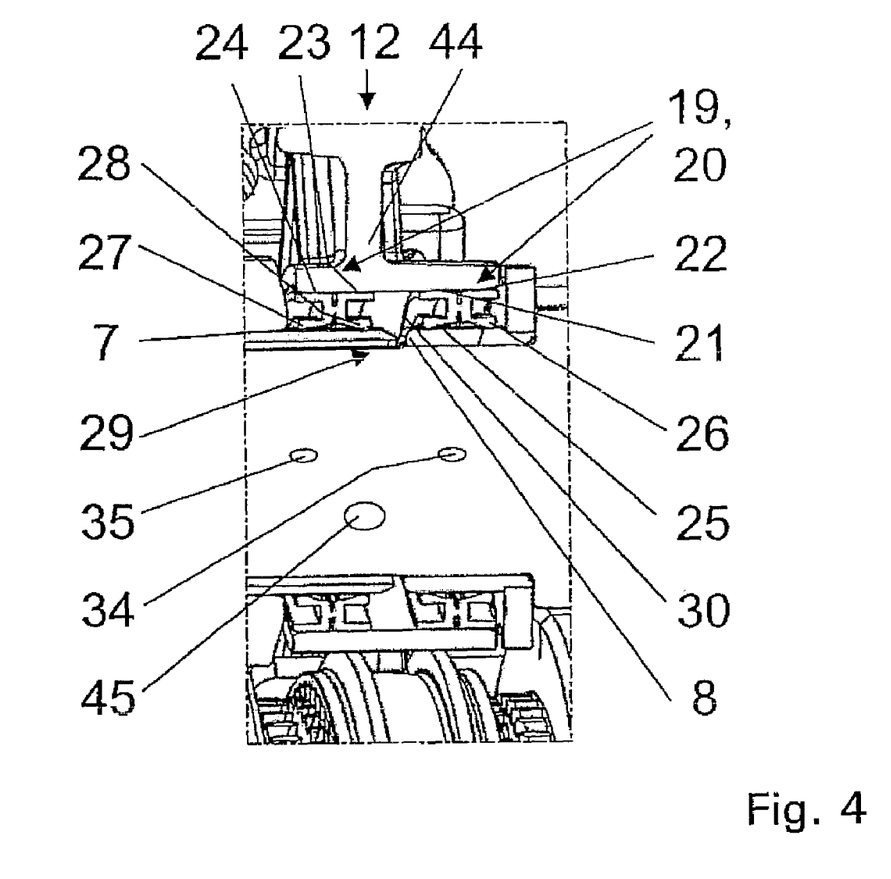
FIG. 4 is a perspective, sectional view of the sealing device with two double sealing rings.

FIG. 4 shows an attachment 44 to the mounting component 12, on which two sealing elements 19, 20 are mounted and advantageously pressed to seal the co-axial drive shafts 7 and 8. The sealing elements 19, 20 are configured as double-sided sealing rings or double sealing rings. Each double sealing ring 19, 20 has two radial shaft, sealing rings 21, 22 and 23, 24, respectively, which are connected to one another and which lie against the central shaft 8 or the hollow shaft 7, via radially interior, sealing lips 25, 26 or 27, 28, respectively. In this manner, the area outside the double sealing rings 19 and 20, which is connected to the transmission chamber 3, is sealed off from an intermediate area 29, which is formed between the double sealing rings 19 and 20 and is connected to the coupling chamber 2, via a radial gap 30 between the hollow shaft 7 and the central shaft 8. The intermediate area 29 is supplied with clutch oil, which lubricates the radially interior, sealing lips 25, 27 of the radial shaft, sealing rings 21, 23.

Figure 8:
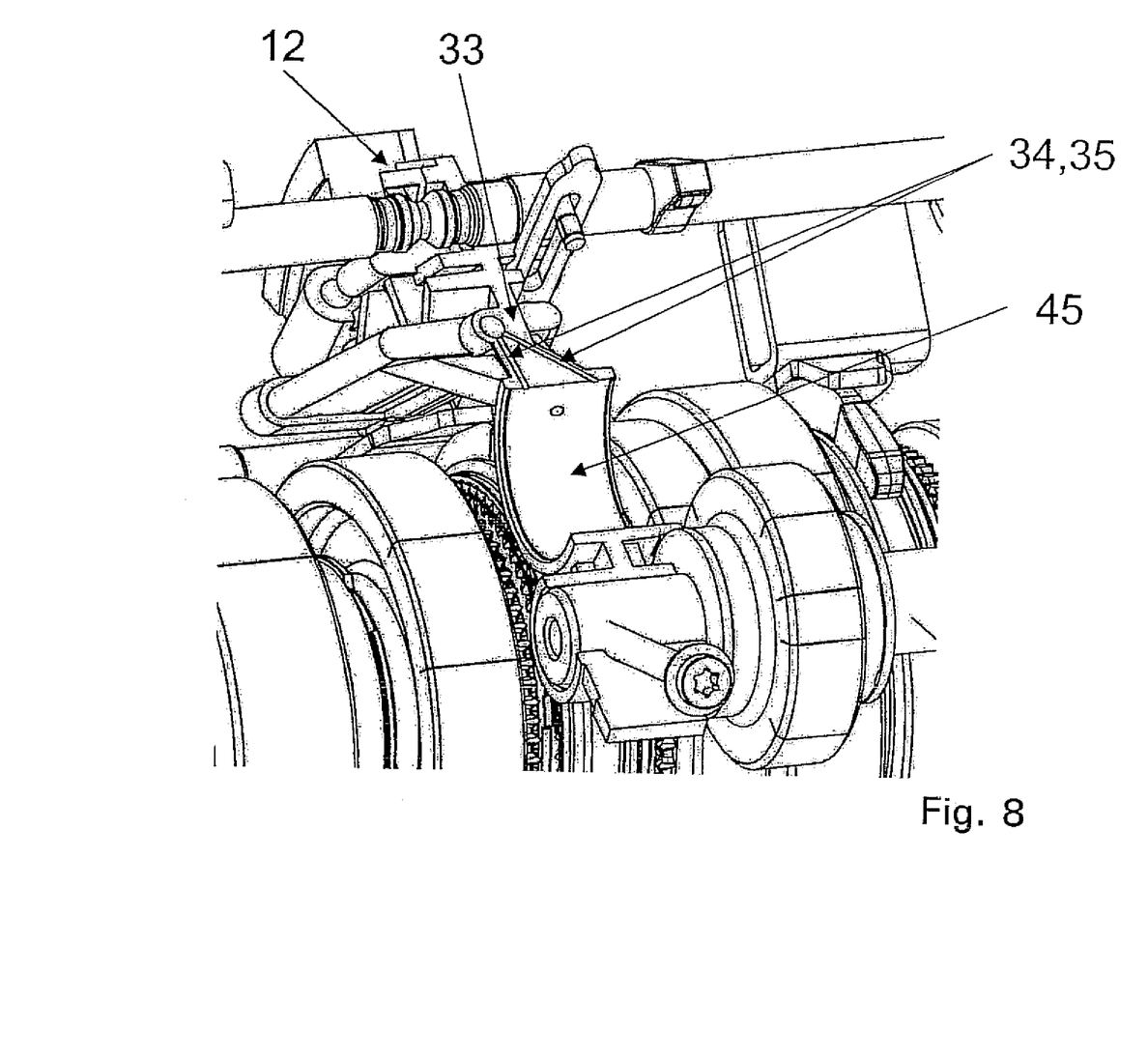
FIG. 8 is a perspective section through the mounting component to illustrate a lubricating oil circuit.

In the intermediate area 29, an oil return 45 is provided for returning the clutch oil in a lubricating oil circuit, via the mounting component 12. This is clarified in the perspective sectional representation in FIG. 8. Radially outside of the double sealing rings 19, 20, the exterior radial, shaft sealing rings 22 and 24 are lubricated with transmission oil. FIG. 8 further shows a ventilation device 33 with two ventilation channels 34, 35. The ventilation channels 34 and/or 35 are situated between the radial shaft, sealing rings 21 and 22 of the first double sealing ring 19 or between the radial shaft, sealing rings 23 and 24 of the second double sealing ring 20. The ventilation channels 34 and 35 lead to the outside of the transmission chamber 3 via a part of the mounting component 12. The ventilation device 33 functions at the same time as a leakage detector.

Figure 6A:
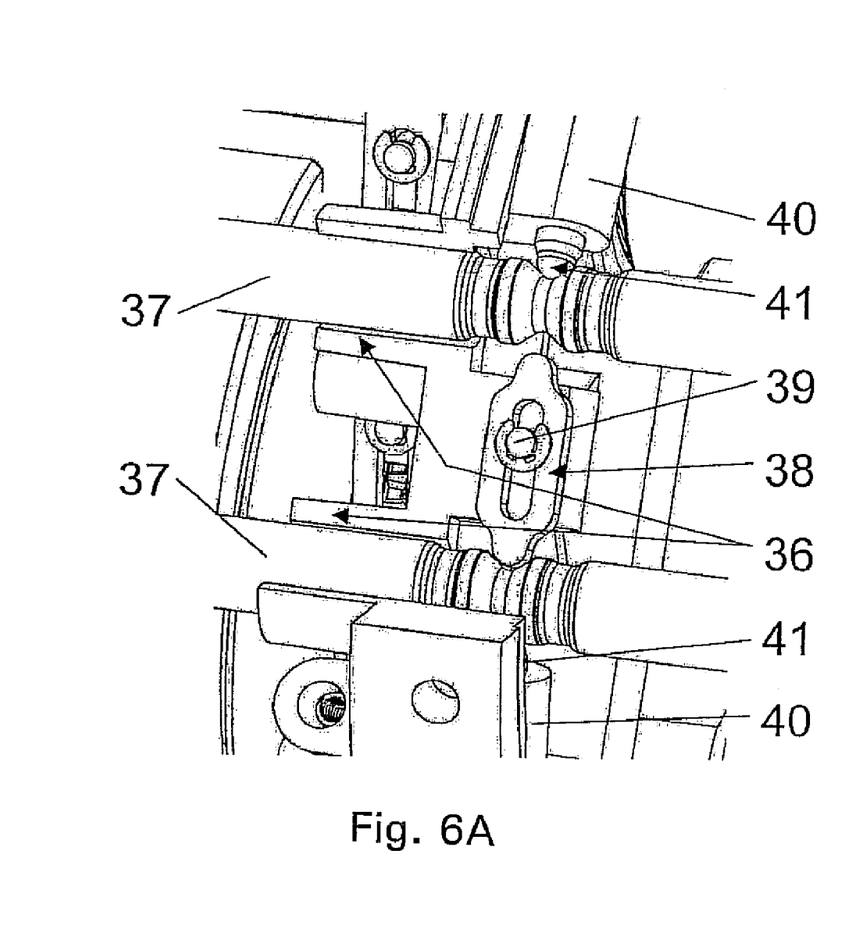
FIG. 6A is a perspective, plan view of the transmission detailing the mounting of shift rods.
Figure 6B:
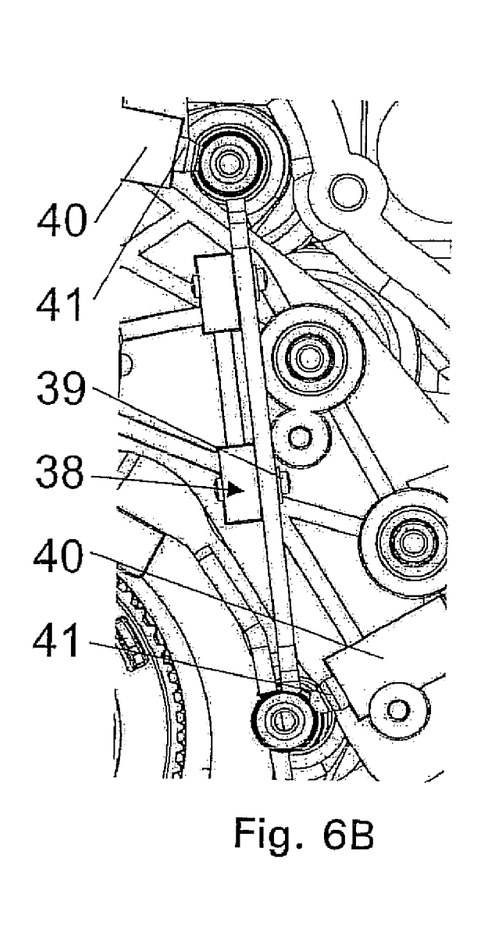
FIG. 6B is a sectional side view of FIG. 6A.
Figures 7A, 7B:
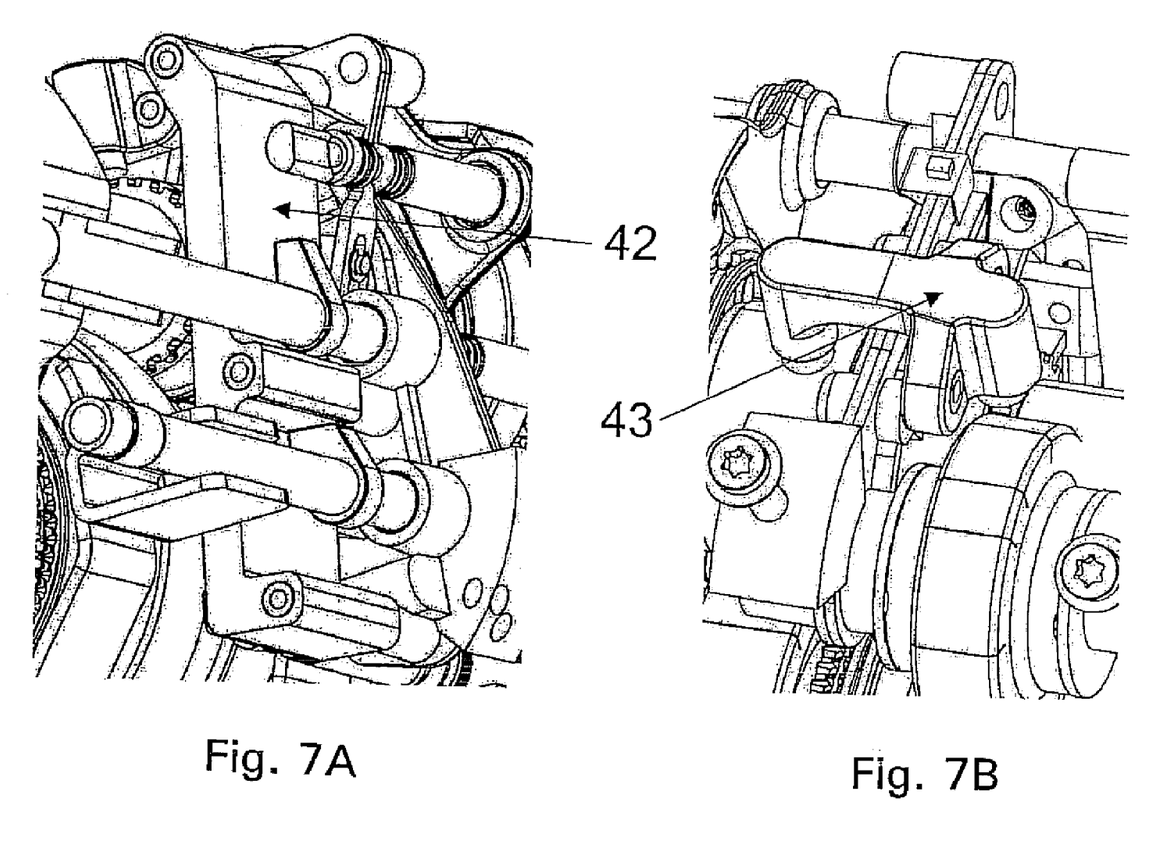
FIG. 7A is a perspective, plan view of the transmission, detailing the accommodation of a sensor device in the mounting component.
FIG. 7B is a perspective, plan view of the transmission, detailing the accommodation of speed sensors for drive shafts.

FIGS. 6 and 7 illustrate two additional functions of the mounting component 12. FIG. 6A shows a plan view of two seats 36 for accommodating two shift rods 37 and a mount 38 for a lock 39 of the shift rods 37 and two mounts 40 for two latching mechanisms 41 for the shift rods 37. FIG. 6B shows a side view of these mounting components.

Finally, FIG. 7A and FIG. 7B show two perspective plan views of a sensor mount, which is integrated into the mounting component 12, for holding sensor elements, especially a sensor tower 42 for the actuation monitoring or control of shift rods of the double clutch transmission, and for holding speed sensors 43 for detecting the speed of drive shafts of the same.

REFERENCE NUMERALS

| | Reference numerals |
|---|---|
| 1 | double clutch transmission |
| 2 | oil chamber/clutch chamber |
| 3 | oil chamber/transmission chamber |
| 4 | double clutch |
| 5 | double clutch transmission wheel set |
| 6 | dividing wall |
| 7 | drive shaft, hollow shaft |
| 8 | drive shaft, central shaft |
| 9 | seal |
| 10 | main transmission shaft |
| 11 | area of emergence |
| 12 | mounting component |
| 13 | transmission housing |
| 14 | pinion shaft |
| 15 | attachment point |
| 16 | attachment point |
| 17 | attachment point |
| 18 | reverse gear, intermediate wheel |
| 19 | double seal |
| 20 | double seal |
| 21 | radial shaft, sealing ring |
| 22 | radial shaft, sealing ring |
| 23 | radial shaft, sealing ring |
| 24 | radial shaft, sealing ring |
| 25 | radially interior, sealing lip |
| 26 | radially interior, sealing lip |
| 27 | radially interior, sealing lip |
| 28 | radially interior, sealing lip |
| 29 | intermediate area |
| 30 | radial gap |
| 31 | fully floating axle |
| 32 | fitted bore |
| 33 | ventilation device/leakage detection |
| 34 | ventilation channel |
| 35 | ventilation channel |
| 36 | seat |
| 37 | shift rod |
| 38 | lock mount |
| 39 | lock |
| 40 | latch mount |
| 41 | latch mechanism |
| 42 | sensor tower |
| 43 | speed sensor |
| 44 | attachment |
| 45 | oil return |

The invention claimed is:

1. A double clutch transmission (1), for a motor vehicle, comprising a transmission housing (13) in which a clutch chamber (2), for accommodating a double clutch (4), is filled with a clutch oil and a transmission chamber (3), for accommodating a double clutch transmission wheel set (5), is filled with transmission oil, first and second drive shafts (7, 8), which are supported coaxially one inside the other whereby the first drive shaft (8) being configured as an interior central shaft emerging from the second drive shaft (7), which is configured as an exterior hollow shaft, at an end of the second drive shaft (7) inside the transmission chamber (3), and in which the first and the second drive shafts (7, 8) being sealed by at least one sealing element to seal the clutch chamber (2) from the transmission chamber (3), a mounting component (12) being arranged inside the transmission housing (13) and fixed thereto for holding first and second adjacent sealing elements (19, 20), the first sealing element (20) forms a seal radially on the hollow drive shaft (7) and the second sealing element (19) forms a seal radially on the central drive shaft (8), the first and the second sealing elements (19, 20) being double sealing rings, each of which comprises two radial shaft, sealing rings (21, 22, 23, 24), an intermediate area (29), which is connected to the clutch chamber (2), is formed between the double sealing rings (19, 20) which, via an area of an interior radial shaft, the sealing rings (21, 23) are supplied with the clutch oil for lubrication, and outside of the double sealing rings (19, 20) an exterior area is formed which is connected to the transmission chamber (3), via exterior radial, shaft sealing rings (22, 24), and supplied with the transmission oil for lubrication;

wherein the mounting component (12), in addition to accommodating the sealing elements (19, 20), also accommodates an intermediate wheel bearing for a reverse gear intermediate wheel (18).

2. The double clutch transmission according to claim 1, wherein an oil return (45), provided in the intermediate area (29) between the double sealing rings (19, 20), is associated with the double clutch (4) for returning the clutch oil to an oil reservoir.

3. The double clutch transmission according to claim 1, wherein a ventilation device (33) is situated between the axially exterior radial shaft sealing ring (22, 24) and the axially interior radial shaft sealing ring (21, 23), and the ventilation device (33) leads outside of the transmission chamber (3) via the mounting component (12).

4. The double clutch transmission according to claim 3, wherein the ventilation device (33) functions as a leakage detector.

5. The double clutch transmission according to claim 1, wherein the mounting component (12) is situated in an area of the transmission chamber (3) that is at least partially open in a radial direction.

6. The double clutch transmission according to claim 5, wherein the mounting component (12) is situated in a cross-sectional plane in the transmission housing (13), in which a synchronization device is also formed on a main shaft (10) of the double clutch transmission (1).

7. The double clutch transmission according to claim 1, wherein the mounting component (12) dissipates bearing forces, which arise on the intermediate wheel bearing, over at least a part of the transmission housing (13).

8. The double clutch transmission according to claim 1, wherein means for mounting at least one shift rod (37) are formed on the mounting component (12).

9. The double clutch transmission according to claim 8, wherein means for mounting at least one latching mechanism (41), for the at least one shift rod (37), are formed on the mounting component (12).

10. The double clutch transmission according to claim 7, wherein means for mounting at least one lock (39), for the at least one shift rod (37), are formed on the mounting component (12).

11. The double clutch transmission according to claim 6, wherein means for attaching sensor elements (42, 43) are formed on the mounting component (12).

* * * * *